(12) United States Patent
Carson, Sr. et al.

(10) Patent No.: US 10,126,005 B1
(45) Date of Patent: Nov. 13, 2018

(54) AIR CONDITIONING SYSTEM

(71) Applicants: William S. Carson, Sr., Lake Wales, FL (US); William S. Carson, Jr., Winter Haven, FL (US)

(72) Inventors: William S. Carson, Sr., Lake Wales, FL (US); William S. Carson, Jr., Winter Haven, FL (US)

( * ) Notice: Subject to any disclaimer, the term of this patent is extended or adjusted under 35 U.S.C. 154(b) by 0 days.

(21) Appl. No.: 15/805,731

(22) Filed: Nov. 7, 2017

Related U.S. Application Data

(63) Continuation-in-part of application No. 15/388,893, filed on Dec. 22, 2016, which is a continuation-in-part of application No. 14/054,436, filed on Oct. 15, 2013, now Pat. No. 9,546,794, which is a continuation-in-part of application No. 12/929,295, filed on Jan. 12, 2011.

(60) Provisional application No. 61/336,090, filed on Jan. 19, 2010.

(51) Int. Cl.
| | |
|---|---|
| F25D 17/04 | (2006.01) |
| F24F 3/14 | (2006.01) |
| F24F 11/00 | (2018.01) |
| G05D 23/19 | (2006.01) |
| G05D 27/02 | (2006.01) |
| G05D 22/02 | (2006.01) |
| F24F 11/30 | (2018.01) |
| F24F 110/10 | (2018.01) |
| F24F 11/65 | (2018.01) |

(52) U.S. Cl.
CPC ........ *F24F 3/1429* (2013.01); *F24F 11/0008* (2013.01); *F24F 11/30* (2018.01); *G05D 22/02* (2013.01); *G05D 23/1927* (2013.01); *G05D 27/02* (2013.01); *F24F 11/65* (2018.01); *F24F 2003/144* (2013.01); *F24F 2110/10* (2018.01); *F24F 2203/02* (2013.01)

(58) Field of Classification Search
CPC ...... F24F 3/1429; F24F 2110/10; F24F 11/30; F24F 11/0008; F24F 11/65; F24F 2003/144; G05D 22/02; G05D 23/1927
See application file for complete search history.

(56) References Cited

U.S. PATENT DOCUMENTS

| | | | | |
|---|---|---|---|---|
| 3,059,448 A | * | 10/1962 | McGrath | F24F 5/001 62/203 |
| 5,495,722 A | * | 3/1996 | Manson | G05B 19/0428 62/125 |
| 9,546,794 B1 | | 1/2017 | Carson et al. | |
| 2010/0312396 A1 | * | 12/2010 | George | G05D 22/02 700/278 |

* cited by examiner

*Primary Examiner* — Ana Vazquez
(74) *Attorney, Agent, or Firm* — William M. Hobby, III

(57) ABSTRACT

The present invention relates to controlling the treatment of air for the inside of a building and especially to controlling a hybrid air conditioning system for the regulation of the air temperature and humidity which utilizes outside air to enhance the efficiency of the system and which has a smoke evacuation system to enhance the safety of firemen and occupants when there is a fire or smoke hazard in the building.

10 Claims, 2 Drawing Sheets

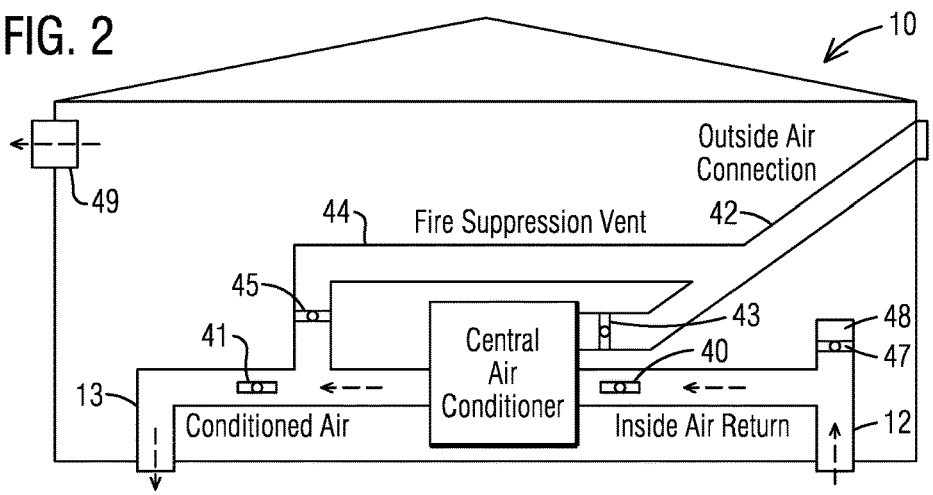
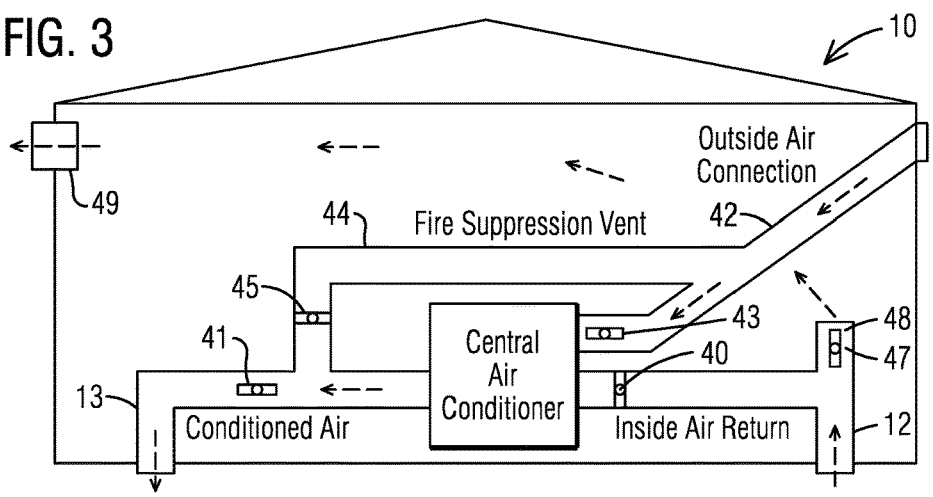
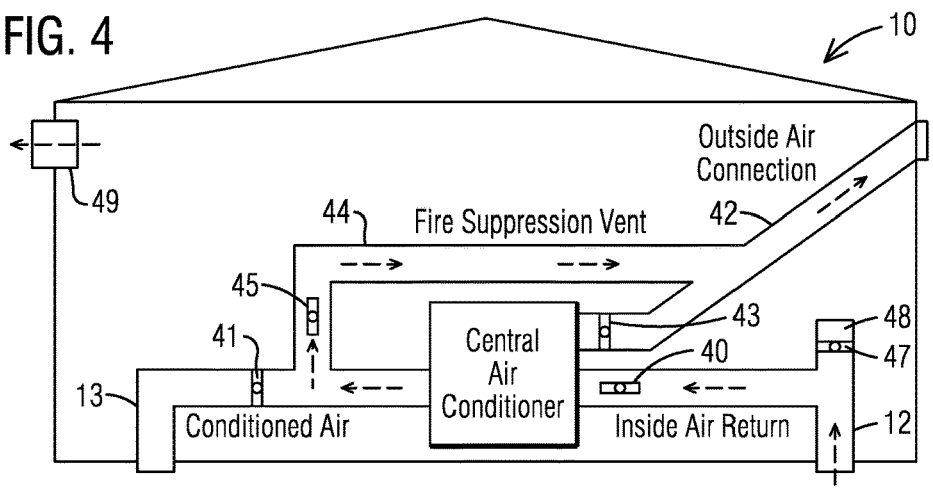

AIR CONDITIONING SYSTEM

This patent application is a continuation-in-part of my U.S. patent application Ser. No. 15/388,893, filed Dec. 22, 2016, for Air Conditioning System which is a continuation-in-part of U.S. Pat. No. 9,546,794, which is continuation-in-part of U.S. patent application Ser. No. 12/929,295, filed Jan. 12, 2011 for a Hybrid Air Conditioning System which claims the benefit of U.S. Provisional Application No. 61/336,090, filed Jan. 19, 2010.

The contents of my prior U.S. Pat. No. 9,546,794, dated Jan. 17, 2017 is incorporated herein in its entirety.

BACKGROUND OF THE INVENTION

The present invention relates to controlling the treatment of air for the inside of a building and especially to controlling a hybrid air conditioning system for the regulation of the air temperature and humidity which utilizes outside air to enhance the efficiency of the system and which has a smoke evacuation system to enhance the safety of firemen and occupants when there is a fire, smoke, or other air hazard in the building.

The present invention is in the technical fields of ventilation, cleaning, cooling, heating, and humidity treatment of inside air. More particularly, the present invention is in the technical fields of equipment and controls for performing inside air comfort and air quality treatments of inside air. The conventional "central air conditioning system" is generally a single unit of a fixed or restricted capacity sized as the largest machine required to cool down a building's interior air on the hottest of days with the highest of heat loads within a relatively short time period. This high level of capacity and power use is typically only needed for approximately one third of the year, meaning that the equipment is over-sized and using more energy than needed to condition interior air for the remaining two-thirds of the year, resulting in problems such as energy wasting, overcooling and "reheats" to control humidity. Inside air treatment needs shift during this "off-season" two-thirds period from the priority function of high heat control by the central air conditioner to that of a need for smaller cooling capacities or for alternate air treatment needs such as control of humidity levels. In these situations, smaller cooling capacity equipment (such as a window unit) or a unit dedicated to a specific function, such as humidity control, can provide superior inside air treatment at significantly lower energy use and costs to the consumer. In addition there are periods when the outside air meets temperature and humidity requirements for indoor comfort so that energy efficiency can be enhanced by drawing in outdoor air without utilizing any of the cooling or heating capacity of the system.

What is needed in order to optimally comfort condition inside air at the lowest energy inputs and costs is a process control that can match specific air comfort conditioning treatments to the optimum size and type equipment designed to best handle each task, using the lowest power consumption by flexibly matching outside air intake and units to changing conditions. With a conventional central air conditioning system, the installation is generally the largest machine needed to cool down a buildings interior air, on the hottest of days with the highest of heat loads, within the relatively short time period necessary to achieve acceptable comfort. This high level of air conditioning power use however is typically only needed for a part of the year, meaning that the equipment is over-sized and uses more energy than needed to comfort condition interior air for the remaining two-thirds of the year. In addition, the air comfort and air quality treatment needs shift from the primary function of heat control by the central air conditioner in summer months to that of controlling other factors, such as humidity, when air temperatures are moderate or mild during fall and spring periods but humidity levels can build up because the cooling function of the air conditioner is not being activated for direct cooling (salient heat removal) of the interior air so as to also indirectly remove water vapor by condensation (latent heat removal) to lower the humidity. In such an example, the invention herein described would detect the increase in humidity level and activate the dedicated dehumidifier to dehumidify the air without running the larger air conditioner which would also lower the air temperature, often to a level where a "reheat" function is needed to raise the air temperature back up to the Set comfort level thereby wasting energy. Similarly, using a smaller air conditioner to cool condition low air heat demands allows the smaller machine to operate more continuously at its optimum design performance—running steadily and efficiently and effectively at a constant rate instead of over-cooling quickly and shutting on and off continuously. With oversized capacity on undersized loads, machine life suffers and breakdowns increase from the constant stops and start short run times of the oversized unit, and with such cycling comfort is compromised while energy is wasted as each cycle consumes considerable more energy than that of a longer running unit that matches the prevailing cooling demands. In addition the system equipment typically runs when the outside air is within a comfort range and which can be utilized to reduce cooling demands for the inside of a building.

When hazardous conditions arise in a building's air, such as smoke from a fire or elevated levels of hazardous materials, such as $CO_2$ levels, a danger is posed for occupants of the building from smoke inhalation and to firemen entering the building. The present system is able to sense the smoke or other hazardous condition and to evacuate the smoke or air from the building to provide occupants additional time to escape the building and to prevent "flash over" fire explosions that occur when smoke and heated gases raise the temperature to an ignition point in the building.

In my prior U.S. Pat. No. 9,546,794, which disclosure is incorporated herein, I provided a hybrid air conditioning system having plural separate air conditioning units and a separate dehumidifier in a process to provide superior air treatment for inside air comfort. The present invention further improves this prior air conditioning system by incorporating therein the use of a ventilation mode to provide fresh air in a building and to enhance the efficiency of the system and to provide a smoke and hazard material venting of the inside air. This protects occupants and firemen entering a building from smoke or hazard material inhalation and from a flash over fire explosion by the ignition of smoke and gases heated to reach an ignition point in the building.

SUMMARY OF THE INVENTION

A central air conditioning system is for conditioning the air in a building having an interior space isolated from the exterior thereof. A central air conditioning unit of predetermined capacity is operatively connected to the building and has an input air duct extending from the interior of the building to the central air conditioning unit, and has a blocking air damper valve therein adapted to selectively shut off the flow of air therethrough. An output air duct extends from the central air conditioning unit into the interior of the building and has a blocking air damper valve therein adapted to selectively shut off the flow of air therethrough. An outside air duct extends from outside the building to the central air conditioning unit and has a blocking air damper valve therein adapted to selectively shut off the flow of air therethrough. A fire suppression air duct extends from the central air conditioning unit output air duct to the exterior of the building and has a blocking air damper valve therein adapted to selectively shut off the flow of air therethrough. An air conditioner control system is operatively connected to the input air duct blocking air damper valve, and the output air duct blocking air damper valve, and the exterior air duct blocking air damper valve and the fire suppression air duct to selectively open and close each of the air duct blocking valves.

The air conditioner control system is adapted to: turn off the exterior air duct blocking air damper valve and the fire suppression air duct blocking air damper valve when the air conditioning system is operating in normal operation mode with the air flow through the open interior air duct and output air duct; and to turn off the input air duct blocking air damper valve and the fire suppression air duct blocking air damper valve and to open the exterior air duct blocking air damper valve when the air conditioning system is operating in an outside air conditioning mode with the air flow through the open exterior air duct and output air duct; and to turn off the output air duct blocking air damper valve and the exterior air duct blocking air damper valve and to open the fire suppression air duct blocking air damper valve and the interior air duct blocking air damper valve when the air conditioning system is operating in fire suppression mode with air flow through the open input air duct and fire suppression air duct to the exterior of the building.

The central air conditioning system may have the fire suppression air duct connected from the central air conditioning unit output air duct and to the outside air duct and therethrough to outside the building. The system advantageously improves the efficiency of an air conditioning system by the use of outside air when the outside temperature is within a desired range and provides an automatic evacuation of smoke or hazardous gases in an emergency for the safety of occupants and firemen or rescue personnel.

BRIEF DESCRIPTION OF THE DRAWINGS

The accompanying drawings, which are included to provide further understanding of the invention, are incorporated in and constitute a part of the specification, and illustrate an embodiment of the invention and together with the description serve to explain the principles of the invention.

FIG. 2 is a diagrammatic view of the ventilation system of the air conditioning system of FIG. 1 in normal mode;

FIG. 3 is a diagrammatic view of the ventilation system of the air conditioning system of FIGS. 1 and 2 in outside air conditioning mode; and FIG. 4 is a diagrammatic view of the ventilation system of the air conditioning system of FIGS. 1 through 3 in smoke venting mode.

DETAILED DESCRIPTION OF THE PREFERRED EMBODIMENT

Figure 1:
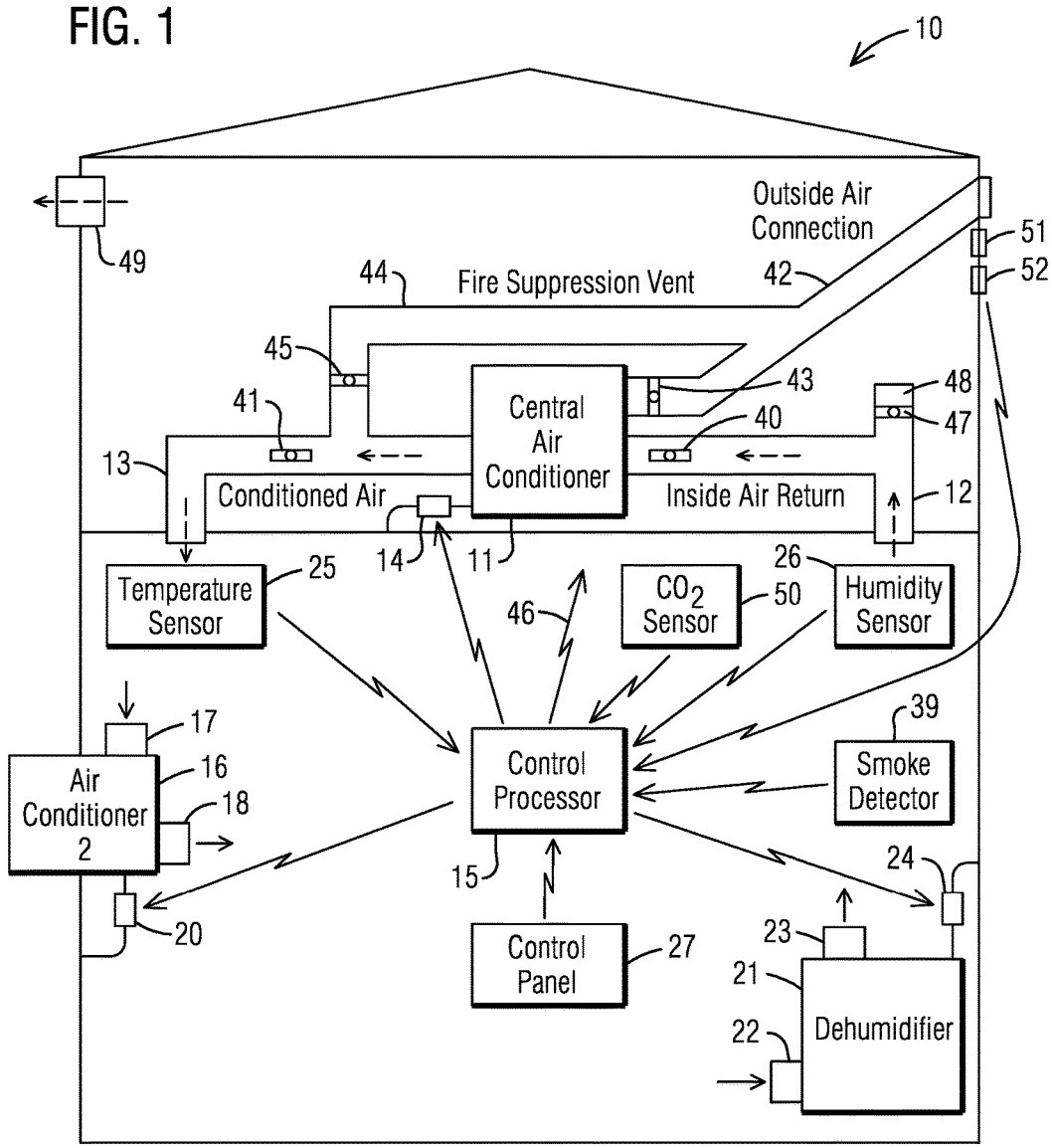
FIG. 1 is a diagrammatic view of a building having a hybrid air conditioning system having a ventilation and air evacuation system in accordance with the present invention.

Referring now to the invention in more detail, FIG. 1 is a diagrammatic view of the present air conditioning system in a building 10 having a first or principal central air conditioner unit 11, which includes a typical air conditioner or heat pump having a heat exchanger coil and air handler unit. The air conditioner unit 11 has an intake air duct 12 for drawing a building's inside air thereinto and an outlet air duct 13 for delivering the conditioned output air therefrom. The use of air conditioner 11 herein includes the use of a reverse cycle air conditioner or heat pump. A wireless on-off switch 14 turns the air conditioning unit 11 on or off in accordance with signals from the control processor 15.

A self-contained second or auxiliary air conditioner or heat pump unit 16 has the same or a smaller capacity than the principal air conditioner unit 11 and also has an intake air supply 17 and a return air duct 18. A wireless on-off switch 20 controls when the air conditioning unit 16 comes on responsive to the control processor 15.

The hybrid system of the present invention has a self-contained and independently operated dehumidifier unit 21, which dehumidifier has an air intake 22 and a return air duct 23. The dehumidifier unit 21 can be selectively operated as a stand alone unit to supply dehumidified air to a building, or in combination with the first and second air conditioner units 11 and 16. A wireless on-off switch 24 turns the dehumidifier 21 on or off in accordance with signals from the control processor 15.

The system information and mechanical components used by the process control include the following conventionally available air conditioning and related parts and equipment. The Process Control System Components includes: a first air conditioner 11; a second air conditioner 16; a dehumidifier 21; a sensor 25 for detecting dry bulb air temperatures; a sensor 26 for sensing humidity to detect inside air humidity or latent heat; and a control processor 15 operatively connected to the other components for running the process to control the operation of the inside air system; and a control panel 27 for user control of the operations controller.

The system may be wired or wireless using RF transceivers or RFID technology using a central transceiver or RFID tags to monitor and run the system.

The System Components, operating either separately or in combination, process the inside air of an interior space by taking in the inside air and treating the inside air for temperature and humidity control purposes, and expelling the treated inside air back into the interior space and where the total capacity of the First and Second air conditioners 11 and 16 would approximate the total capacity of a standard installation for a single air conditioner for the same application, and where the second air conditioner 16 is preferably of a lower capacity than the first air conditioner 11 but can also be of equal output. System components can be flexibly placed for convenience, low installation costs, easier servicing, and overall performance, by using wireless connections to the process controller 15. The maximum efficiency of an A/C system is accomplished when an A/C system runs more or less continuously rather than being continuously cycled on and off and also for the moisture being removed from the air.

The building 10 central air conditioning unit 11 has a building interior air return 12 which has a blocking air damper valve 40 operated by a solenoid or stepper motor to open the passageway therethrough or to block the passageway responsive to commands from the control processor 15. An output duct 13 also has a blocking air damper valve 41 operated by a solenoid or stepper motor to open the passageway therethrough or to block the passageway responsive to commands from the control processor 15. An outside air duct 42 extends from the exterior of the building 10 to the central air conditioner 11 and also has a blocking air damper valve 43 operated by a solenoid or stepper motor to open the passageway therethrough or to block the passageway responsive to commands from the control processor 15. Finally a fire suppression duct 44 connects the output from the central air conditioner 11 to the exterior of the building, such as by coupling the duct 44 to the interior output duct 13 at one end, and to the outside air duct 42 at the other end. It will of course be understood that the fire suppression duct 44 can be connected directly to the exterior of the building 10 rather connecting to the outside air duct 42. The fire suppression duct 44 also has a blocking air damper valve 45 operated by a solenoid or stepper motor to open the passageway therethrough or to block the passageway responsive to commands from the control processor 15. A further evacuation duct 47 is coupled to the inside air duct 12 and has a blocking air damper valve 48 operated by a solenoid or stepper motor to open the passageway therethrough or to block the passageway into the attic of the building responsive to commands from the control processor 15. The air evacuated through the duct 48 into the attic may then exhaust through an attic vent 49 to the exterior of the building 10 which vent may have a vent fan as desired. The commands from the control processor 15 to each of the blocking air damper valve solenoids is illustrated by arrow 46.

The present system has added a smoke/fire sensor 50 to the interior of the building 10 operatively coupled to the control processor 15 and a temperature sensor 51 and humidity 52 on the exterior of the building 10. These sensors are also operatively coupled to the control processor 15.

The operation of the air conditioning system is illustrated in connection with FIGS. 2, 3 and 4. FIG. 2 illustrates the normal operation of the air conditioning system in which the blocking air damper valve 40 in the air return duct is open for the passage of air entering the interior air inlet duct 12 into the central air conditioner 11. The blocking air damper valve 41 is also opened for the passage of air from the central conditioner duct 11 to pass air through the output air duct 13 back into the interior in the building 10. The outside air duct 42 blocking air damper valve 43 is closed as is the fire suppression duct 44 blocking air damper duct 45 and the evacuation duct 47 blocking air damper valve 48. The operation in this mode is like a conventional central air conditioning system.

The outside air conditioning air mode as can be seen in FIG. 3, illustrates the use of outside air as part of the air conditioning for the building 10. The blocking air damper valve 40 in the air return duct is closed blocking the passage of air from entering through the interior air inlet duct 12 into the central air conditioner 11. The blocking air damper valve 41 however remains open for the passage of air from the central conditioner duct 11 to pass air through the output air duct 13 into the interior of the building 10. The outside air duct 42 blocking air damper valve 43 is opened to allow air from outside the building 10 to pass through the central air conditioner 11 while the fire suppression duct 44 blocking air damper duct 45 remains closed. The evacuation duct 47 blocking air damper valve 48 is opened in this mode which allows air to pass from the interior of the building 10 into the attic where it can be evacuated out the attic vent 49 which may have an attic venting fan to help in the evacuation of the heated air in the attic. The operation in this mode utilizes outside air which may also be further conditioned by the central air conditioner 11. This mode improves the efficiency of the system at times when the outside air is within a desired range of temperature and humidity. It also has the advantage of bringing fresh air into the building. It will of course be clear that each of these modes can operate with air conditioner 16 and dehumidifier 21 as more clearly set forth in my prior U.S. Pat. No. 9,546,794.

The smoke evacuation mode as seen in FIG. 4, evacuates smoke or heated air or CO2 or any hazardous gases from the building 10 when they are sensed by a smoke detector 39 or CO2 detector 50. This protects occupants and firemen entering a building from smoke or hazard material inhalation and from a flash over fire explosion by the ignition of smoke and gases heated to reach an ignition point in the building 10. The blocking air damper valve 40 in the air return duct 12 is open in this mode allowing the passage of air to enter through the interior air inlet duct 12 into the central air conditioner 11. The blocking air damper valve 41 however is closed to block the passage of air from the central conditioner duct 11 to pass air through the output air duct 13 back into the interior in the building 10. The outside air duct 42 blocking air damper valve 43 is closed to prevent fresh air from outside the building 10 to pass through the central air conditioner 11. The fire suppression duct 44 blocking air damper duct 45 is opened to force air smoke or hazardous air out the duct 44 and out the the outside air duct and outside the building 10. Evacuation duct 47 blocking air damper valve 48 is closed in this mode to prevent smoke and gases from entering the attic. It should be clear that while the fire suppression duct 44 is illustrated coupled to the outside air duct 42, the duct 44 could just as easily go straight out of the building 10. This is a safety mode that can greatly improves the safety of occupants and firemen in emergencies, such as from smoke inhalation injuries or the like in the building 10. It also has the advantage of blocking smoke or hazardous air from rapidly spreading through the building by blocking the primary output duct from feeding the smoke to secondary outlets throughout the building.

The control processor 15 represents the operational control device that executes the process control functions. The control processor 15 is fed reading from the sensors 25, 26 and CO2 sensor 50 on the interior of the building and from sensors 51 and 52 on the exterior of the building and is programmed to determine which mode of the air handling system to actuate. The control processor 15 also responds to conditions set by the control panel 27 to actuate secondary air conditioning units 16 and dehumidifiers 21.

The process control sensors and equipment described can be wired or wireless, and the control processor can be remotely accessed, programmed, and controlled remotely via internet phone line, power lines or wireless connections, without limitation to additionally reduce service calls and maintenance costs.

The advantages of the present invention include, without limitation, that it saves air conditioning operational energy and costs and delivers increased comfort and air quality while increasing the efficiency of the air conditioning system. It also enhances the safety of occupants and firemen in the event of emergencies. The control processor is able to selectively match the air handling for the specific air conditioning treatments needed or desired with more effective and efficient equipment.

The invention also provides utility power suppliers with an interface to reduce air conditioning energy consumption during peak periods and offers customer controls to reduce rates at off-peak use. The invention also provides users with air conditioning backup in case of a failure of a single unit, and less subject to harmful short-cycling on and off while running the equipment at design peak efficiency and effectiveness.

In the broad embodiment, the present invention is a new type of air conditioning system for automatically achieving higher efficiency and comfort, using the new process control for selective use of the dedicated air conditioning equipment of varying size and treatment capabilities, and air handling modes based on sensor derived air conditions utilizing outside air to meet a specified user comfort setting needs, that can save energy and costs.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples which are to be considered illustrative rather restrictive.

We claim:

1. A central air conditioning system for conditioning air in a building comprising:

the building having an interior space isolated from an exterior of said building;

a central air conditioning unit of predetermined capacity operatively connected to said building;

an input air duct extending from the interior of said building to said central air conditioning unit, said input duct having a blocking air damper valve therein adapted to shut off a flow of air therethrough;

an output air duct extending from said central air conditioning unit into the interior of said building, said output duct having a blocking air damper valve therein adapted to shut off a flow of air therethrough;

an outside air duct extending from outside said building to said central air conditioning unit, said outside air duct having a blocking air damper valve therein adapted to shut off a flow of air therethrough;

a fire suppression air duct extending from said central air conditioning unit output air duct to outside said building, said fire suppression air duct having a blocking air damper valve therein adapted to shut off a flow of air therethrough;

an air conditioner control processor operatively connected to said input air duct blocking air damper valve, said output air duct blocking air damper valve, said exterior air duct blocking air damper valve and said fire suppression air duct blocking air damper valve;

said air conditioner control processor being adapted to:

turn off said outside air duct blocking air damper valve and said fire suppression air duct blocking air damper valve when said air conditioning system is operating in normal operation mode with the air flow through the open input air duct and output air duct, and to turn off said input air duct blocking air damper valve and said fire suppression air duct blocking air damper valve and to open said outside air duct blocking air damper valve when said air conditioning system is operating in outside air conditioning mode with the air flow through the open outside air duct and output air duct, and to turn off said output air duct blocking air damper valve and said outside air duct blocking air damper valve and to open said fire suppression air duct blocking air damper valve and said interior air duct blocking air damper valve when said air conditioning system is operating in fire suppression mode with air flow through the open input air duct and fire suppression air duct;

whereby the air in the building is adapted to be conditioned with outside air and to have hazardous air evacuated therefrom.

2. The central air conditioning system in accordance with claim 1 in which said fire suppression air duct extends from said central air conditioning unit output air duct to said outside air duct and therethrough to the outside of said building.

3. The central air conditioning system in accordance with claim 2 in which said air conditioning system has a temperature sensor for sensing temperature within said building and a humidity sensor for sensing humidity within said building and a smoke/fire sensor within said building, each said sensor being operatively connected to said control processor.

4. The central air conditioning system in accordance with claim 3 in which said input air duct has a second blocking air damper valve therein adapted to open said input air duct into an attic of said building when in the outside air conditioning mode.

5. The central air conditioning system in accordance with claim 4 in which said building attic has a vent to the outside of said building to vent gases from said attic.

6. The central air conditioning system in accordance with claim 3 in which said air conditioning system includes outside temperature and humidity sensors operatively coupled to said control processor.

7. The process for conditioning the air in a building in accordance with claim 6 in which said control processor has a wireless connection to said outside temperature and humidity sensors.

8. The process for conditioning the air in a building in accordance with claim 7 in which said control processor has a wireless connection to said interior temperature sensor and a wireless connection to said interior humidity sensor.

9. The central air conditioning system in accordance with claim 1 having a second air conditioning unit having an equal or smaller capacity than said central air conditioning unit and having a dehumidifier each operatively connected to said control processor.

10. The process for conditioning the air in a building in accordance with claim 9 in which said control processor has a wireless connection to said central and second air conditioning units and to said dehumidifier.

\* \* \* \* \*